Figure 1:
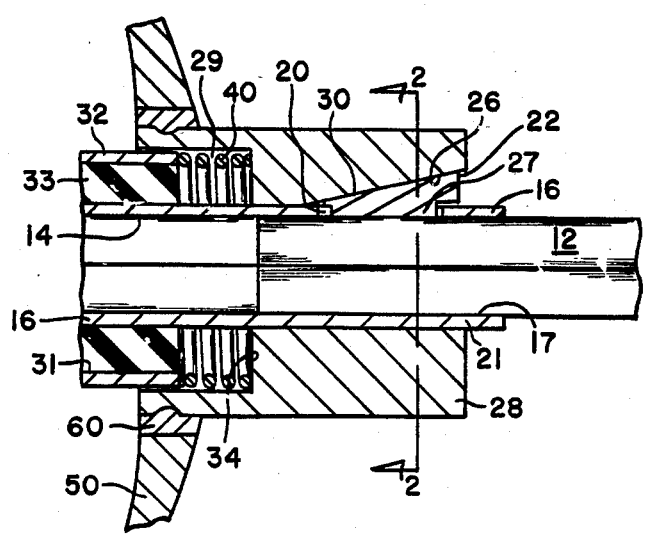

United States Patent [19]

Parks

[11] Patent Number: 4,563,912
[45] Date of Patent: Jan. 14, 1986

[54] TELESCOPING POLYGONAL STEERING COLUMN

[75] Inventor: Kevin B. Parks, Mishawaka, Ind.

[73] Assignee: Allied Corporation, Morristown, N.J.

[21] Appl. No.: 562,658

[22] Filed: Dec. 19, 1983

[51] Int. Cl.$^4$ .............................................. B62D 1/18
[52] U.S. Cl. ...................... 74/493; 403/351; 403/369
[58] Field of Search ............... 74/485, 493; 403/351, 403/368, 369, 370, 374

[56] References Cited

U.S. PATENT DOCUMENTS

| | | | |
|---|---|---|---|
| 2,744,419 | 5/1956 | Chayne | 74/493 |
| 2,836,078 | 5/1958 | Yonkers | 74/493 |
| 3,316,774 | 5/1967 | Vogelgesang | 74/493 |
| 3,570,322 | 3/1971 | Krouse | 74/493 |
| 3,656,785 | 4/1972 | Lothar | 403/370 |
| 3,962,931 | 6/1976 | Moneta | 74/493 |

Primary Examiner—Alan Cohan
Assistant Examiner—John A. Rivell
Attorney, Agent, or Firm—Larry J. Palguta; Ken C. Decker

[57] ABSTRACT

A steering column comprises inner and outer hexagonal-shaped shafts (12, 16), the inner shaft (12) being disposed within a bore (14) of the outer shaft (16). A mechanism for eliminating lost motion or "lash" between the two shafts comprises a plurality of slots (20) located in the outer shaft (16), the slots being circumferentially offset relative to one another. Wedges (22, 23) are located in respective slots (20) and abut corresponding polygonal surfaces of the inner shaft (12), with a collar (28) telescoped over the inner and outer shafts and having inclined ramps (30) at the interior thereof in alignment with respective wedges (22, 23) and slots (20), the ramps loading and causing inward movement of the wedges against the surfaces of the inner shaft (12) upon axial movement of the collar (28) relative to the outer shaft (16). A spring member (29) telescoped over the inner and outer shafts biases the collar member (28) axially into engagement with the wedges (22, 23) whereby a plurality of surfaces (13, 17) of the inner shaft (12) engage in surface-to-surface contact a plurality of adjacent surfaces (18, 21) of the outer shaft (16).

12 Claims, 2 Drawing Figures

TELESCOPING POLYGONAL STEERING COLUMN

This invention relates to a telescoping polygonal steering column which eliminates "lash" between polygonal shafts of the column.

Many automotive manufacturers provide vehicles having steering column systems that are axially compliant in order to compensate for assembly tolerances, crash-collapse compliance, packaging restraints, and dynamic motions between the body and the frame. Steering column systems include these characteristics because tolerances between the steering gear input shaft and steering column are so large that compensation for the tolerance range is essential. Also, imperfections in universal joint concentricities as well as small movements between the steering gear and steering column due to dynamic road inputs, require that there be some degree of compliance between the members of the steering column, or extremely high, unnecessary binding loads could occur. The necessary compliance can be provided by a telescoping steering column system which enables a reduced cost of assembly because the steering gear and column can be preinstalled and then the compliant steering shaft installed at a later time.

Several telescoping steering column constructions have been described in prior patents such as: D. E. Runkle U.S. Pat. No. 3,318,170 issued May 9, 1967 and entitled "No-Lash Axially Movable Steering Column"; D. E. Runkle et al. U.S. Pat. No. 3,369,425 issued Feb. 20, 1968 and entitled "Adjustable No-Lash Axially Movable Steering Column"; D. E. Runkle U.S. Pat. No. 3,434,369 issued Mar. 25, 1969 and entitled "No-Lash Axially Movable Steering Column"; D. E. Runkle U.S. Pat. No. 3,444,753 issued May 20, 1969 and entitled "No-Lash Axially Movable Steering Column"; and D. E. Runkle U.S. Pat. No. 3,473,406 issued Oct. 21, 1969 and entitled "No-Lash Axially Movable Steering Column"; all of these patents being assigned to the same assignee as herein. These patents describe the use of polygonal shafts mated for compliance in conjunction with a device for taking up lash and providing a predetermined collapse force. The various devices provide for rotation of the inner shaft relative to the outer shaft until positive contact between the polygonal corners eliminates the free lash. However, because load forces are transmitted at the corners of the interior polygonal shaft, repeated loading results in a high degree of point contact wear which causes the preload members that bias the wedge or balls inwardly to compensate for additional lash and thereby results in degradation of the predetermined collapse force. In addition, when torque is applied in the opposite direction of rotation, the preload members which force the shafts into engagement may not produce enough force to resist the torque, and thereby result in separation of the two shafts. Also, where reversing torque directions is common, the seating and unseating effects could produce an unsatisfactory noise level.

The present invention solves the above-described problems by providing a steering column comprising inner and outer polygonal shafts, the inner shaft being disposed within a bore of the outer shaft. A plurality of slots are located in the outer shaft, the slots being circumferentially offset relative to one another. A plurality of wedges are located in respective slots and abut corresponding polygonal surfaces of the inner shaft, with a preload collar telescoped over the inner and outer shafts and having inclined ramps on the inner surfaces thereof in alignment with the respective wedges and slots, the ramps loading and causing inward movement of the wedges against the surfaces of the inner shaft upon axial movement of the collar relative to the outer shaft. A spring member telescoped over the inner and outer shafts biases the collar member axially into engagement with the wedges whereby a plurality of surfaces of the inner shaft are biased into surface-to-surface contact with a plurality of adjacent surfaces of the bore in the outer shaft.

The wedges are circumferentially offset relative to one another and in conjunction with the preloaded collar, bias the polygonal-shaped shafts into surface-to-surface contact between several adjacent surfaces thereof. The offset wedges are disposed at greater than zero degrees but less than 180° relative to each other. This causes several surfaces of the inner shaft to engage the adjacent bore surfaces of the outer shaft in line-to-line contact which eliminates "lash" while reducing the inherent noise problems of the previous designs. The friction between the wedges and inner shaft provides a controlled collapse load, with the mated polygonal surfaces effecting a lower unit load with a resulting reduction in wear.

Figure 2:
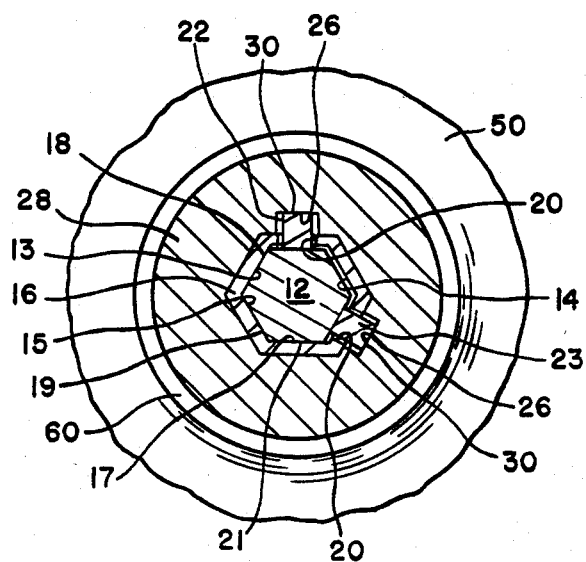

The invention is described in detail below with reference to the drawings, in which:

FIG. 1 is an enlarged section view of a portion of a vehicle steering column showing axially movable components thereof and the mechanism incorporating the invention; and FIG. 2, is a section view taken along view line 2—2 of FIG. 1.

Referring to FIGS. 1 and 2, it can be seen that the shaft 12 having a hexagonal shape is located in a corresponding hexagonal bore 14 formed in a shaft 16. Shaft 12 is suitably connected to a steering wheel (not shown) of a vehicle, whereas the shaft 16 is connected to the steering gear (not shown) of the vehicle. Because of the telescopic arrangement between shafts 12 and 16, the axial adjustment or movement of the shafts relative to one another can be accomplished by force imposed upon the inner shaft through the steering wheel. Furthermore, in the event of accident, injury to the driver is minimized because the steering column can telescope or collapse upon impact.

The structure which couples together the two hexagonal shafts and eliminates lash comprises a plurality of circumferentially offset slots 20 located in the outer shaft 16 with a slidable wedge 22 or 23 disposed in a respective slot. Each wedge 22, 23 abuts a polygonal surface of the inner shaft 12, to bias surfaces 13 and 17 of inner shaft 12 into line-to-line surface engagement with adjacent polygonal surfaces 18 and 21 of inner bore 14 of outer shaft 16. Wedges 22, 23 each includes an inclined surface 26 and a step 27 received within an axial slot 20.

Surface 15 of inner shaft 12 engages surface 19 of shaft 16 but these surfaces are not disposed opposite a wedge which would bias the surfaces together in intimate contact therebetween. Although the close contact of surfaces 15 and 19 contributes to the elimination of free lash, normal manufacturing tolerances would not normally result in surface-to-surface contact. However, the provision of tighter manufacturing tolerances would permit line-to-line contact between the surfaces 15 and 19.

Disposed about the shafts is a preload collar 28 having axially extending ramps 30 in alignment with associated wedges and slots. Collar 28 includes bore 29 in which is received shaft 32 of the steering gear, opening 31 of shaft 32 receiving shaft 16 and elastomer insulator 33 and a coupling pin (not shown) to eliminate any rotation therebetween. Spring 40 is telescoped about inner and outer shafts 12 and 16, and also is disposed within bore 29 with one end engaging the end of shaft 32 and the other end seated against shoulder 34 of bore 29. Spring 40 biases the preload collar 28 in an axial direction whereby inclined ramps 30 engage the inclined surfaces 26 of wedges 22 and 23. The axial movement of collar 28 causes wedges 22 and 23 to be biased inwardly against the polygonal surfaces of inner shaft 12. Located about the perimeter of one end of collar 28 is a bearing or bushing 60 which supports a firewall boot 50.

It is apparent from the above that the telescoping shafts with circumferentially offset, inwardly biased wedges eliminate the "free lash" that exists between inner and outer shafts 12 and 16. Because the slots 20, wedges 22 and 23, and associated ramps 30 are circumferentially offset, the polygonal surfaces 13 and 17 of inner shaft 12 are biased into engagement with adjacent polygonal surfaces 18 and 21 of bore 14 in shaft 16. This line-to-line surface contact of several surfaces of the inner and outer shafts fully eliminates torsional lash between the shafts. In addition, the line-to-line mating of the polygonal surfaces provides for a lower unit loading force on each surface and thus results in reduced wear between the shafts.

Although the circumferentially offset orientation of the wedges fully eliminates torsional lash, there is still provided a controlled friction collapse force between the two shafts so that the inner shaft will telescope and move axially inwardly along the inner bore of the outer shaft when a sudden force of sufficient magnitude is applied to the steering wheel. This construction also eliminates noise caused by the seating and unseating effects of previous designs.

In the described embodiment, at least two surfaces of each hexagonal shaft are in line-to-line engagement with two surfaces of the other shaft, such that the center lines of the shafts are offset relative to one another. The off-center positions of the shafts can be compensated for by appropriate placement of the U-joints disposed at the ends of the shafts and comprising part of the steering column assembly.

Tighter manufacturing tolerances can increase the number of surfaces in line-to-line engagement, this number depending upon the shape of the shafts.

Although this invention has been described in connection with the illustrated embodiment, it will be obvious to those skilled in the art that various changes may be made in the form, structure, and arrangement of parts without departing from the invention; for example, shafts having shapes and corresponding bores other than hexagonal would be suitable in the practice of this invention.

I claim:

1. An axially movable steering column comprising inner and outer shafts one of which is axially movable with respect to the other of said shafts, said inner shaft having a polygonal shape and said outer shaft having a corresponding polygonal bore therein for receiving said inner shaft, and means operatively connected to said inner and outer shafts for causing rotation and continuous frictional engagement of one of said shafts with respect to the other of said shafts and eliminating torsional lash therebetween, said means comprising a plurality of slots located in said outer shaft and circumferentially offset relative to one another, a plurality of inclined wedges each being located in a respective slot for abutting a polygonal surface of said inner shaft, a collar member telescoped over said inner and outer shafts and having a plurality of inclined ramps located at the interior thereof, each inclined ramp in alignment and contact with a respective inclined wedge for loading and causing inward movement of the inclined wedge against said inner shaft upon axial movement of said collar member relative to said outer shaft, means for preventing rotation of said collar member relative to said outer shaft but permitting axial movement of the collar member relative to the outer shaft, and means telescoped over said inner and outer shafts for biasing said collar member against said inclined wedges, the engagement of the inclined ramps with the inclined wedges causing a plurality of surfaces of said inner shaft to engage a plurality of adjacent surfaces of said outer shaft in surface-to-surface contact to eliminate torsional lash therebetween and causing the axial center line of said inner shaft to be offset from the axial center line of said outer shaft.

2. The steering column in accordance with claim 1, wherein said means for preventing rotation of said collar member comprises a polygonal-shaped outer shaft and a polygonal bore in the collar member receiving the outer shaft therein.

3. The steering column in accordance with claim 1, wherein the inner and outer shafts each have a hexagonal shape and the surfaces in surface-to-surface contact comprise at least two surfaces of each shaft.

4. The steering column in accordance with claim 1, wherein said collar member has a polygonal-shaped bore for slidingly engaging associated surfaces of the outer shaft.

5. The steering column in accordance with claim 1, wherein the inclined wedges each include a radial ledge extension disposed between the associated inclined ramp and inner shaft and disposed in the associated slot.

6. The steering column in accordance with claim 1, wherein said collar member includes a radially interior axial bore having the telescoping means disposed therein and biasingly engaging a radial shoulder of said axial bore.

7. The steering column in accordance with claim 6, wherein the steering column further comprises a third shaft disposed radially between the outer shaft and collar member and extending within the bore to provide a seat for an end of said telescoping means.

8. The steering column in accordance with claim 7, wherein the steering column comprises a resilient insulator disposed between the third shaft and outer shaft.

9. An axially movable steering column comprising inner and outer shafts one of which is axially movable with respect to the other of said shafts, said inner shaft having a polygonal shape and said outer shaft having a corresponding polygonal shape and bore therein for receiving said inner shaft, and means operatively connected to said inner and outer shafts for causing rotation and continuous frictional engagement of one of said shafts with respect to the other of said shafts and eliminating torsional lash therebetween, said means comprising a plurality of slots located in said outer shaft and circumferentially offset relative to one another, a plurality of inclined wedges each being located in a respective slot for abutting a polygonal surface of said inner shaft, a collar member telescoped over said inner and outer shafts and having a plurality of inclined ramps and a polygonal bore located at the interior thereof, each inclined ramp in alignment and contact with a respective inclined wedge for loading and causing inward movement of said inclined wedge against said inner shaft upon axial movement of said collar member relative to said outer shaft, the polygonal inner bore of said collar member receiving the polygonal-shaped outer shaft to prevent rotation of said collar member relative to said outer shaft but permitting axial movement of the collar member relative to the outer shaft, and means for biasing said collar member against said inclined wedges, the biasing means comprising a spring disposed about said shafts, the engagement of the inclined ramps with the respective inclined wedges causing a plurality of surfaces of said inner shaft to engage in surface-to-surface contact a plurality of adjacent surfaces of said outer shaft to eliminate torsional lash therebetween.

10. The steering column in accordance with claim 9, wherein said collar member includes a radially interior axial bore having the spring disposed therein and biasingly engaging a radial shoulder of said axial bore.

11. The steering column in accordance with claim 10, wherein the steering column further comprises a third shaft disposed radially between the outer shaft and collar member and extending within the bore to provide a seat for an end of said spring.

12. The steering column in accordance with claim 11, wherein the steering column comprises a resilient insulator disposed between the third shaft and outer shaft.

* * * * *